United States Patent
Sturgill et al.

(10) Patent No.: US 11,210,487 B2
(45) Date of Patent: Dec. 28, 2021

(54) PROGRESSIVE IDENTIFIER

(71) Applicant: Hewlett-Packard Development Company, L.P., Spring, TX (US)

(72) Inventors: Malgorzata M. Sturgill, Fort Collins, CO (US); Steven J. Simske, Fort Collins, CO (US); A. Marie Vans, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 16 days.

(21) Appl. No.: 16/629,616

(22) PCT Filed: Jul. 14, 2017

(86) PCT No.: PCT/US2017/042124
§ 371 (c)(1),
(2) Date: Jan. 9, 2020

(87) PCT Pub. No.: WO2019/013819
PCT Pub. Date: Jan. 17, 2019

(65) Prior Publication Data
US 2021/0150165 A1    May 20, 2021

(51) Int. Cl.
*G06K 7/14* (2006.01)
(52) U.S. Cl.
CPC ......... *G06K 7/1417* (2013.01); *G06K 7/1413* (2013.01)
(58) Field of Classification Search
CPC .. G06K 7/1417; G06K 7/1413; G06K 7/1491; G06K 7/146
See application file for complete search history.

(56) References Cited

U.S. PATENT DOCUMENTS

| 8,792,141 B2 | 7/2014 | Moore et al. |
| 2008/0078829 A1 | 4/2008 | Woodward |
| 2009/0296995 A1 | 12/2009 | Shibuya |
| 2014/0339312 A1* | 11/2014 | Simske .................. G06K 7/12 235/462.04 |
| 2015/0302325 A1 | 10/2015 | Holmes et al. |

FOREIGN PATENT DOCUMENTS

| WO | WO-2003038714 | 5/2003 |
| WO | WO-2013109276 | 7/2013 |
| WO | WO-2014116222 A1 * | 7/2014 ....... G06K 19/06037 |
| WO | WO-2015119592 | 8/2015 |
| WO | WO-2016130792 | 8/2016 |

OTHER PUBLICATIONS

Copp, A. J. et al., "Barcodes are a useful tool for labeling and tracking ecological samples." The Bulletin of the Ecological Society of America 95, No. 3 (2014): 293-300.

\* cited by examiner

Primary Examiner — Matthew Mikels
(74) Attorney, Agent, or Firm — Fabian VanCott

(57) ABSTRACT

An example system includes a stage identification portion to determine a stage in a progression of a progressive identifier, and an identifier encoding portion to encode or read the progressive identifier. A number or percentage of bits of the progressive identifier encoded, or read as encoded, by the identifier encoding portion is uniquely associated with the stage in the progression.

20 Claims, 5 Drawing Sheets

PROGRESSIVE IDENTIFIER

BACKGROUND

Identifiers, such as bar codes, are used to uniquely identify each of a large set of items. For example, bar codes or other identifiers may be used to identify retail items. Similarly, serial numbers on various products are used to identify each individual product in such a set. Such identifiers may be applied to packaging material or may be applied to objects using labels or medallions, or even impressed or stamped directly on the object.

BRIEF DESCRIPTION OF THE DRAWINGS

For a more complete understanding of various examples, reference is now made to the following description taken in connection with the accompanying drawings in which.

DETAILED DESCRIPTION

Various examples described herein relate to systems using progressive identifiers, such as progressive barcodes. In various examples, the structure of the progressive identifier at each stage may be indicative of the stage. For example, the number of bits or a percentage of bits available of the progressive identifier that are encoded may uniquely identify the stage in the progression. In some examples, the number or percentage of bits encoded may also be indicative of rights assigned to particular users. For example, the number or percentage of bits encoded may restrict access to the content encoded in the identifier to certain users.

As noted above, various identifiers may be applied to uniquely identify a product, for example. In various examples, a product may be a physical object, such as a package, a label or a printed document. In other examples, a product may be a virtual object, such as an electronic record, electronic transaction, electronic document or the like. The product may be any of a variety of objects, such as an object for retail sale, a component for a larger assembly, etc. The identifier may be any of a variety of identifiers, such as a bar code, a 2-D bar code such as a quick-response (QR) code, a pattern applied to a surface (e.g., a contoured surface of a three-dimensional object) or the like. The identifier may be used to identify various features of the product.

Progressive identifiers may be incremented at various stages of a progression. In various examples, the progression may be a logical progression, such as a workflow or a supply chain. Accordingly, a product with a progressive identifier may be processed through various stages of the progression. At each stage, the identifier may be modified by changing a portion of the identifier from the previous stage. In accordance with various examples described herein, the structure of an identifier at a given stage in the progression may be indicative of that stage. In some examples, the structure may be used to allow or restrict access to various users by assigning rights associated with the identifier.

In various examples, as described below, a progressive identifier may be formed with a combination of empty space (or un-encoded space) and encoded space. In an example binary system, the progressive identifier may be represented as a combination (e.g., a string) of 0's and 1's. In some examples, such as a two-dimensional bar code (e.g., QR code), empty space (or "0") may be represented with a white bit or square, and encoded space may be represented by a non-white square. In a binary system, the non-white space may be black. In a non-binary system, the non-white space may be, for example, cyan, magenta, yellow, or a combination thereof (resulting in red, blue or green, in most cases). In another example, the non-white space may be represented with variations of grayscale.

Figure 1:
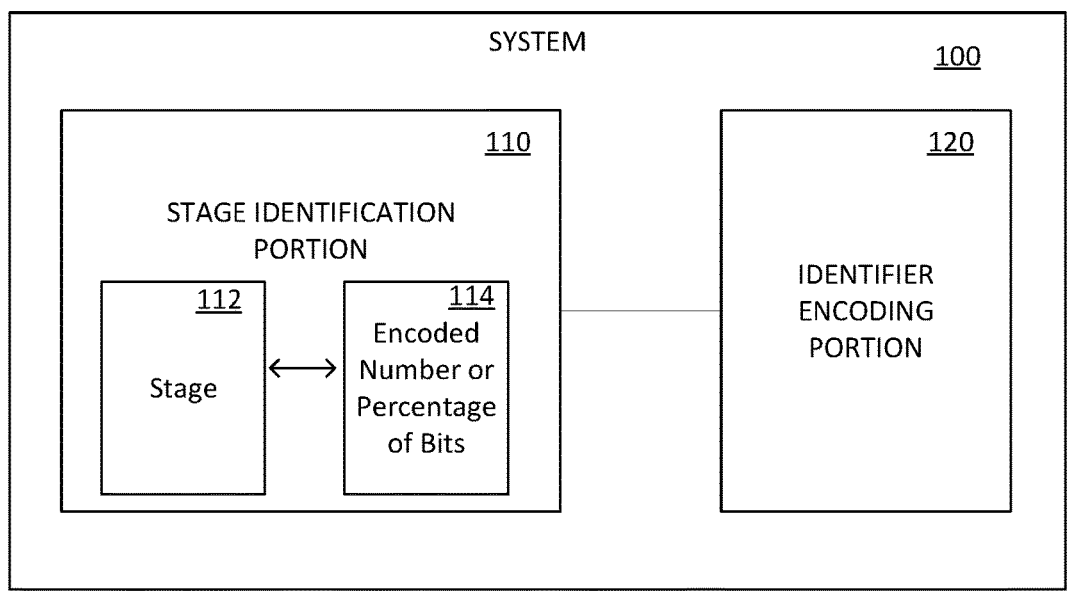
FIG. 1 illustrates an example system of progressive identifiers.

Referring now to FIG. 1, an example system of progressive identifiers is schematically illustrated. The example system 100 of FIG. 1 may be implemented in any of a variety of applications. For example, the example system 100 may be implemented in a manufacturing environment, such as an assembly line. Of course, various other environments are possible and are contemplated within the scope of the present disclosure.

The example system 100 of FIG. 1 includes a stage identification portion 110. In various examples, the stage identification portion 110 may be implemented as hardware, software or firmware. In various examples, the stage identification portion 110 is provided to determine a stage in a progression of a progressive identifier. The stage identification portion 110 may be implemented in a central processor which may also control various functions of the example system 100 and may communicate with other systems or controllers outside the example system 100.

The example system 100 of FIG. 1 includes an identifier encoding portion 120 coupled to the stage identification portion 110. The identifier encoding portion 120 may be provided to either encode the progressive identifier, to read the progressive identifier or both, as described in greater detail below.

In one example, a progressive identifier may be received by the system 100, and the stage identification portion 110 may determine the stage in the progression of the progressive identifier. For example, upon receipt of the progressive identifier, the identifier encoding portion 120 may read the received identifier. In this regard, the identifier encoding portion 120 may include a scanner (e.g., a laser scanner), a camera or other image capture device. In some examples, a data parser may be included to identify or extract information from the received identifier. Upon reading of the received identifier, the identifier encoding portion 120 may determine the number or percentage of bits in the identifier that are encoded and forward that information to the stage identification portion 110.

In one example, the number or percentage of encoded bits refers to the portion of an identifier that is used to encode information. For example, a portion of the identifier may be used to encode a 0 or a 1, while the remaining portion is null. In other examples, the number or percentage of encoded bits refers to the portion of an identifier that is encoded with 1's (or non-zero), while the remaining portion is encoded with 0's.

In various examples of the system 100, the stage in the progression may be uniquely associated with the structure of the progressive identifier. For example, as illustrated in the example of FIG. 1, the stage identification portion 110 may be provided with a one-to-one relationship between each stage 112 of the progression and the number or percentage of available bits 114 that are encoded in the identifier. For example, in one example 4-stage progression, the relationship between the stage 112 and the number of bits encoded 114 may be as follows:

TABLE 1

| Stage | Number of Encoded Bits |
|---|---|
| 1 | 32 |
| 2 | 64 |
| 3 | 96 |
| 4 | 128 |

Thus, the stage identification portion 110 may use the number of encoded bits received from the identifier encoding portion 120 to identify the stage in the progression without the need to read the information encoded in the identifier. The stage identification portion 110 can identify the stage based on the structure of the identifier (e.g., number of encoded bits).

In other examples, the stage identification portion 110 may determine the stage for which an identifier must be encoded. The stage identification portion 110 may use the relationship between the stage 112 and the number or percentage of bits encoded 114 to determine the number or percentage of bits to be encoded for the next stage. The stage identification portion 110 may provide the number or percentage of bits to be encoded to the identifier encoding portion 120 for encoding or modifying of the identifier accordingly.

In this regard, the identifier encoding portion 120 may include, for example, a printer to selectively modify portions of the identifier, such as changing empty space (e.g., un-encoded bits) to encoded space (e.g., encoded bits) or changing the encoding of encoded bits. For example, the printer may be a color printer to change the selected portions (e.g., bits) of the identifier to cyan, magenta, yellow or a combination thereof. In other examples, the printer may be a three-dimensional printer. In this regard, empty space may be associated with lack of material in a region, and encoded space may be associated with material formed in the region. In other examples, empty space may be associated with a base material, and encoded space may be associated with the base material treated with a pigment or a dye.

In various examples, the identifier encoding portion 120 may be provided with a database or an algorithm to determine the changes to be made to the identifier. In various examples, the identifier encoding portion 120 may select portions of the empty space in the identifier to be changed to encoded space. The selection of the portions of the identifier to be changed may be based on or indicated by the database or algorithm.

Figure 2:
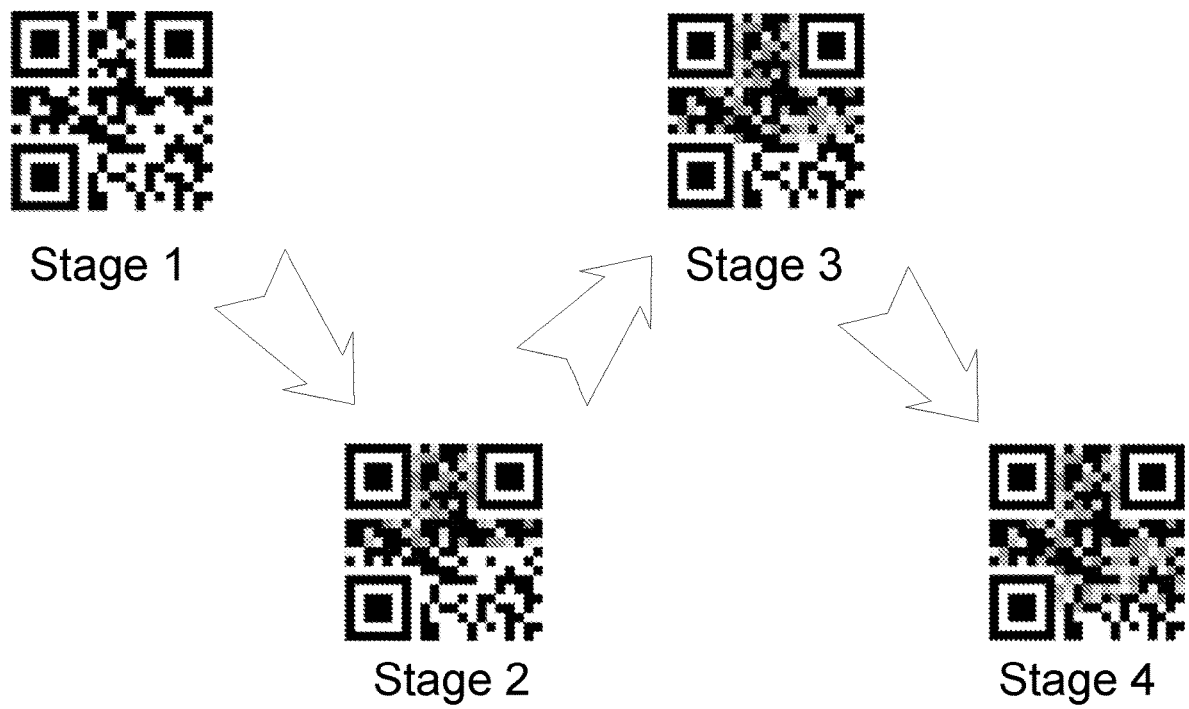
FIG. 2 illustrates an example identifier and an example progression.

Referring now to FIG. 2, an example identifier is illustrated that may be used to represent a progressive identifier. The example identifier of FIG. 2 is a two-dimensional, machine readable, bar code, such as a QR-code, having a plurality of regions (e.g., squares) that may be un-encoded (e.g., white) or encoded (e.g., non-white). In various examples, additional colors may also be used, such as cyan, magenta, yellow, varying levels of grey or a combination thereof. Of course, in other examples, another set of colors may be used in printing of the progression of the identifier. The example identifier is illustrated at various stages of the progression. For example, at a first stage (Stage 1), which in various examples may be a manufacturing stage, the identifier may be a representation of a code determined or selected by a controller at the first stage, such as the identifier encoding portion 120 of the example system 100 of FIG. 1. The identifier may be modified at a second stage (e.g., packaging stage) with an increase in the number or percentage of encoded bits (Stage 2). Again, in the example of FIG. 2, the identifier at the second stage may be a representation of a code determined or selected by a controller, such as a corresponding identifier encoding portion 120 at the second stage. The identifier may be similarly modified further for Stage 3 and Stage 4, as illustrated in FIG. 2.

In various examples, the identifiers may have a representation as a string of characters. For example, the identifiers of FIG. 2 may be represented as a binary string of 0's and 1's. In other examples, the identifiers may be represented with a non-binary string of characters that may include various other types of characters, such as lower case letters, upper case letters, numerals, and/or various other types of characters.

Figure 3:
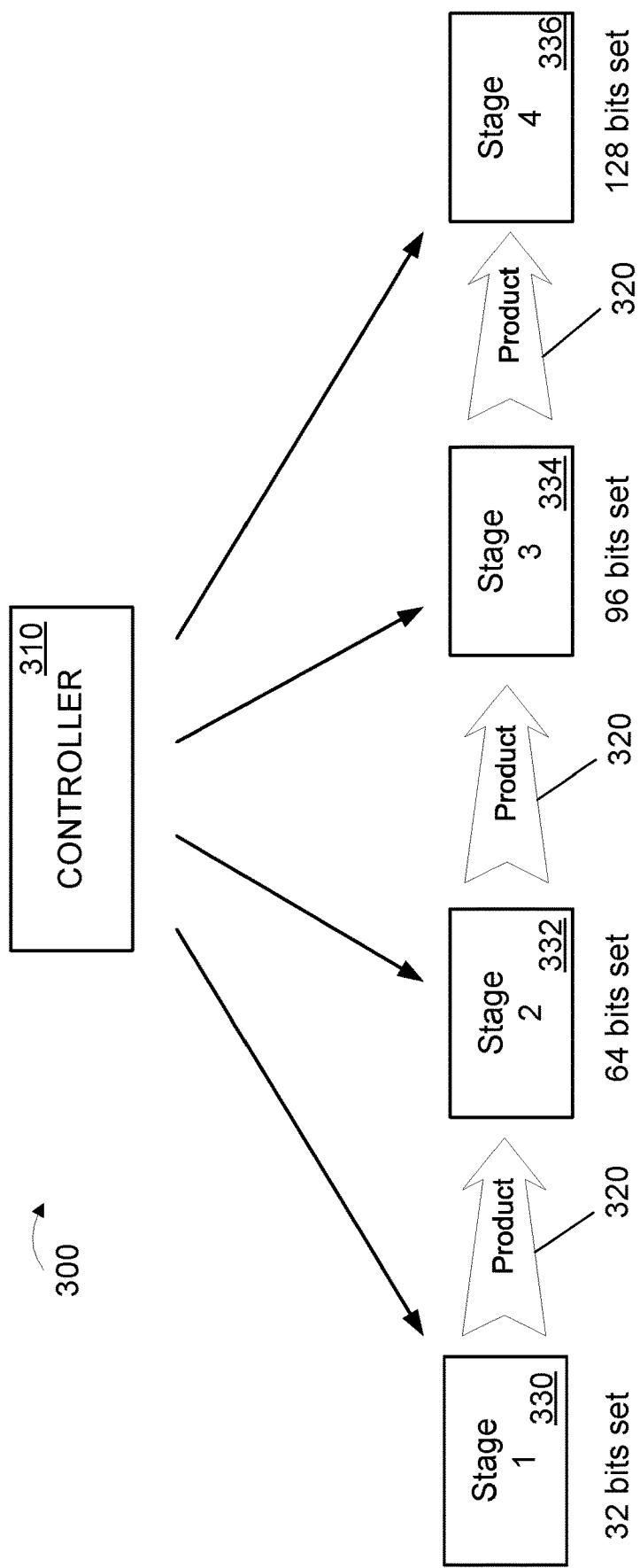
FIG. 3 illustrates an example progression of a progressive identifier through various stages.

Referring now to FIG. 3, an example progression of a progressive identifier is illustrated through various stages. In various examples, the example progression 300 may be associated with a workflow, such as the passing of a product through various entities or stages of the progression 300, such as stage 1 330, stage 2, 332, stage 3 334, and 4 336. Thus, each stage of the progression 300 corresponds to a different position in the workflow. The example of FIG. 3 illustrates a product 320 progressing through the various stages 330-336 in the progression. In various examples, the various stages 330-336 may correspond to, for example, manufacturing, packaging, shipping, etc. Of course, in various examples, the example progression 300 may include additional stages.

In various examples, one or more stages in the progression 300 may include identifiers from a controller 310, as indicated by the arrows from the controller 310 to each stage 330-336 in the progression 300. The controller 310 may be a central controller which may be responsible for the progression 300, for example. In this regard, the controller 110 may include a database or logic to select the portions in each identifier to be changed.

As illustrated in FIG. 3, the number or percentage of bits encoded, or set, in the identifier is uniquely associated with each stage. For example, at stage 1, the identifier includes 32 bits set, 64 bits at stage 2, 96 bits at stage 3, and 128 bits at stage 4. Of course, in other examples, the number of bits at each stage may be different from those illustrated in FIG. 3 and Table 1 above.

Figure 4:
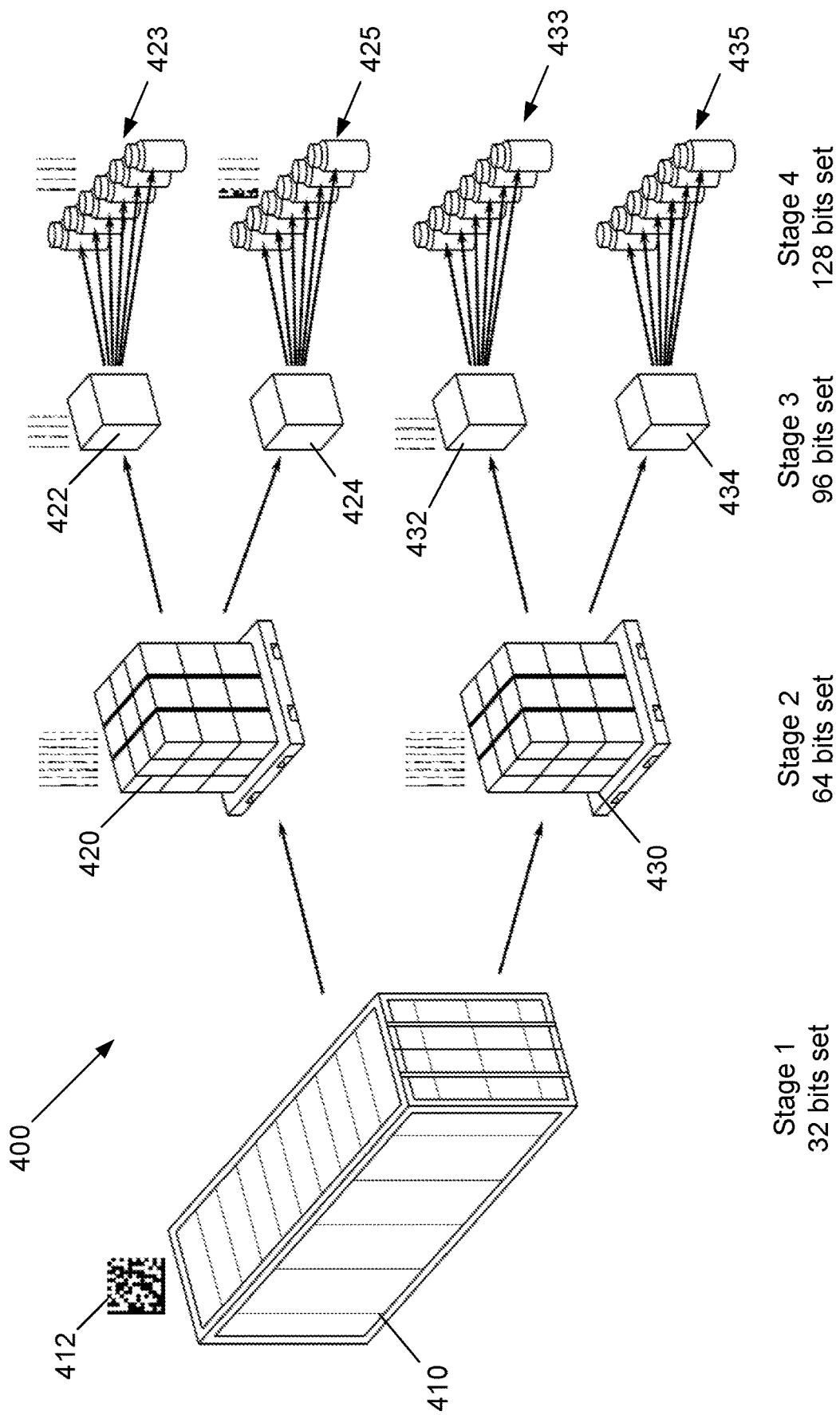
FIG. 4 illustrates another example progression of a progressive identifier through various stages.

Referring now to FIG. 4, another example progression of a progressive identifier is illustrated through various stages. In various examples, the example progression 400 of FIG. 4 may be associated with a hierarchical arrangement, with each stage corresponding to a different level in the hierarchy. For example, in the example illustrated in FIG. 4, the progression of a progressive identifier may be associated with the hierarchical relationship in a nested container arrangement. In the example of FIG. 4, stage 1 corresponds to a shipping container 410 which may be associated with a progressive identifier 412. The progressive identifier at stage 1 is encoded for the appropriate stage and is encoded with 32 bits set, in accordance with the example of Table 1 above. The shipping container 410 may contain one or multiple pallets. The example of FIG. 4 illustrates two pallets 420, 430, but other examples may include any appropriate number of pallets. The pallets 420, 430 represent stage 2 of the progression, and the identifier is accordingly encoded with 64 bits in accordance with the example of Table 1.

Similarly, each pallet 420, 430 may contain one or multiple boxes. The example of FIG. 4 illustrates two boxes 422, 424, 432, 434 from each pallet 420, 430, but each pallet 420, 430 may contain any appropriate number of boxes. In some examples, each pallet 420, 430 contains the same number of boxes, while in other examples, some pallets 420, 430 may have a different number of boxes. The boxes 422, 424, 432, 434 represent stage 3 of the progression, and the identifier is accordingly encoded with 96 bits in accordance with the example of Table 1.

Further, each box 422, 424, 432, 434 may contain one or multiple objects. The example of FIG. 4 illustrates objects 423, 425, 433, 435 from each box 422, 424, 432, 434. Various examples may include boxes 422, 424, 432, 434 with any appropriate number of objects. The objects 423, 425, 433, 435 represent stage 4 of the progression, and the identifier is accordingly encoded with 128 bits in accordance with the example of Table 1.

Referring again to FIG. 1, in some examples, the system 100 may assign access rights to various users based on the number or percentage of bits encoded. In this regard, upon determining the number or percentage of bits of the progressive identifier that are encoded, the system 100 may allow or restrict access to data encoded in the identifier, or allowing or limiting rights to perform other actions (e.g., trigger an event or a workflow), for at least one user. In the example progression illustrated in FIG. 3, the access rights may be assigned to three users with different roles in the flow. For example, User 1 may be an initiator of a request but is not allowed any further control or visibility until the flow is complete. User 2 may be a management individual or entity with the ability to direct, update or alter the request at various stages, and User 3 may be an individual or entity to process the request. The access rights assigned to the various user may be as follows:

TABLE 2

| Encoded Bits | User 1 | User 2 | User 3 |
| --- | --- | --- | --- |
| 32 | Enter request | No access | No access |
| 64 | View initial request | Update request and send to User 3 | No access |
| 96 | View initial request | Trigger additional workflow to process a return of data | Process data |
| 128 | View resolution | Create resolution | No access |

Similarly, access rights may be assigned to various users in the example progression described above with reference to FIG. 4. In one example, access rights may be assigned to two users: an inspection agent (User 1) and a transportation worker (User 2). The access rights may be assigned as follows:

TABLE 3

| Encoded Bits | User 1 | User 2 |
| --- | --- | --- |
| 32 | Reroute shipment for verification | Record item location; Trigger investigation |
| 64 | Record deep inspection; Schedule container for additional inspection | Record item location; Trigger investigation |
| 96 | Record cursory inspection | Record item location; Trigger investigation |
| 128 | Record item location | Record item location |

Thus, in various examples, access rights may be determined by the number or percentage of bits encoded in the progressive identifier. Further, the number or percentage of bits in a scanned identifier may allow for triggering of a workflow, such as the additional workflow that may be triggered by User 2 in Table 2 if the identifier is encoded with 96 bits.

Figure 5:
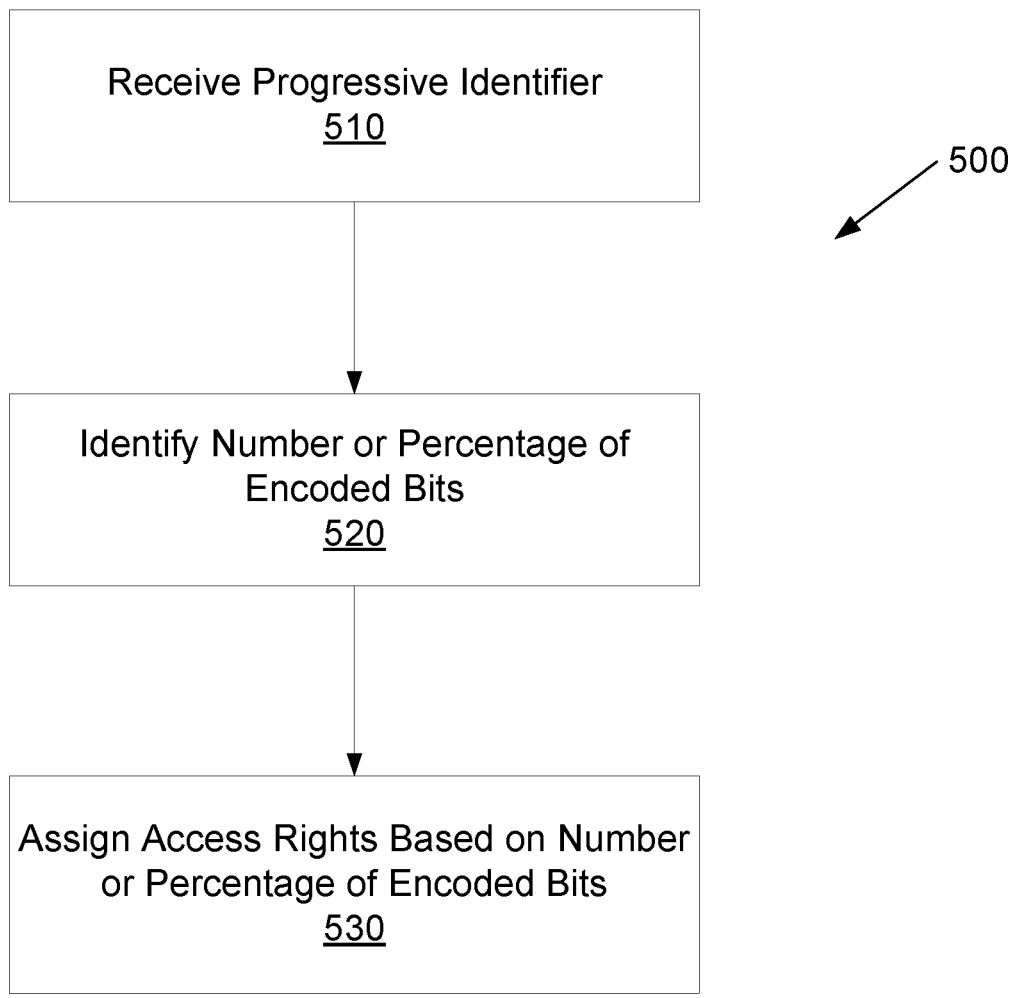
FIG. 5 is a flow chart illustrating an example method for a progressive identifier.

Referring now to FIG. 5, a flow chart illustrates an example method for a progressive identifier. The example method 500 may be implemented in various systems, including the example systems described above with reference to FIGS. 1-4. In accordance with the example method 500, a progressive identifier is received at a stage of a progression (block 510). As noted above, the progressive identifier includes encoded data, such as data to uniquely identify an object, for example.

At block 520 of the example method 500, a number or percentage of encoded bits in the received progressive identifier is identified. As noted above, a progressive identifier may have a different number or percentage of bits encoded at different stages of the progression. Based on the number or percentage of encoded bits, access rights may be assigned to at least one user (block 530). The access rights may be associated with the progressive identifier, such as allowing or limiting rights to change or add a workflow for an object associated with the progressive identifier, for example. Thus, access rights may be determined based solely on the number or percentage of encoded bits of a progressive identifier, without reading of the data encoded in the progressive identifier.

In various examples, the progressive identifier may be advanced to a further stage of the progression based on the number or percentage of bits encoded in the received identifier. For example, upon identifying the number or percentage of encoded bits in the received identifier, the progressive identifier may be modified to generate a modified progressive identifier. The modified progressive identifier may have an increased number or percentage of encoded bits. As noted above, the modification of the progressive identifier may be based on a database or an algorithm, for example. The increased number or percentage of encoded bits may uniquely correspond to the next stage in the progression. For example, as described above, the number or percentage of bits encoded may have a one-to-one relationship with the various stages in the progression. The modified progressive identifier may then be forwarded to the next stage in the progression. The assigning of access rights based on the number or percentage of encoded bits can be repeated at the next stage.

In various examples, the structure of the progressive identifier may include security data that allows access to secure information at or after a predetermined stage in the progression. For example, as the number or percentage of encoded bits increases, at least parts of the security data to access the secure information may be added to the progressive identifier. The complete security data may become available at the predetermined stage, for example. In one example, the security data may be an exclusive OR (XOR) mask. In various examples, the secure information may be stored at a server associated with at least one stage of the progression. Thus, when the complete security data becomes available, the XOR mask can be used by the server to perform an XOR operation with the use of a single-use string (e.g., nonce). A successful XOR operation, or chained XOR operation, may allow the server to release the secure information to at least one user. In various examples, at later stages, a similar XOR operation using an extended XOR mask may be used to rescind access to the secure information. For example, additional encoded bits may form the extended mask which may be XOR'ed with another single-use string to rescind access to the secure information. Thus, the progressive identifier may be used to restrict access to secure information to a single stage or a limited range of stages.

Figure 6:
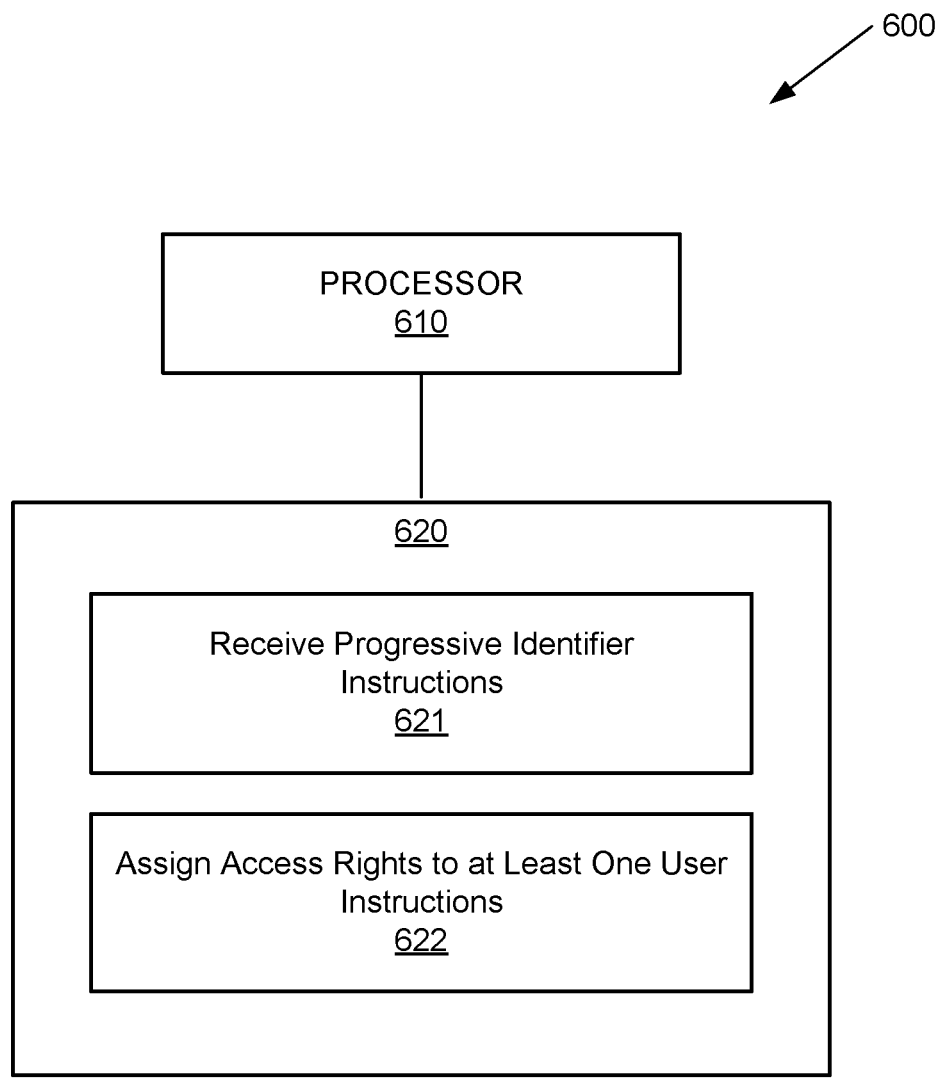
FIG. 6 illustrates a block diagram of an example system with a computer-readable storage medium including instructions executable by a processor for a progressive identifier.

Referring now to FIG. 6, a block diagram of an example system is illustrated with a non-transitory computer-readable storage medium including instructions executable by a processor for a progressive identifier. The system 600 includes a processor 610 and a non-transitory computer-readable storage medium 620. The computer-readable storage medium 620 includes example instructions 621-622 executable by the processor 610 to perform various functionalities described herein. In various examples, the non-transitory computer-readable storage medium 620 may be any of a variety of storage devices including, but not limited to, a random access memory (RAM) a dynamic RAM (DRAM), static RAM (SRAM), flash memory, read-only memory (ROM), programmable ROM (PROM), electrically erasable PROM (EEPROM), or the like. In various examples, the processor 610 may be a general purpose processor, special purpose logic, or the like.

The example instructions include receive progressive identifier instructions 621. As noted above, the progressive identifier may be received at a stage of a progression and may include encoded data, such as data to uniquely identify an object, for example. The progressive identifier includes a number or percentage of encoded bits that, in various examples, is uniquely associated with the stage in the progression. The example instructions further include assign access rights to at least one user instructions 622. As described above, in various examples, access rights associated with the progressive identifier may be assigned to various users based on the number or percentage of encoded bits in the user. Various examples of the assignment of access rights are described above in Tables 2 and 3.

Thus, in various examples, the structure of a progressive identifier at each stage may be indicative of the stage or may be used to control access rights to various users. Further, in some examples, the structure may be used as security data to securely provide access to certain data.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A system, comprising:
a stage identification portion to determine a stage in a progression of a progressive identifier; and
an identifier encoding portion to encode or read the progressive identifier,
wherein a number or percentage of bits of the progressive identifier encoded, or read as encoded, by the identifier encoding portion is uniquely associated with the stage in the progression.

2. The system of claim 1, wherein access rights associated with the progressive identifier for at least one user are based on the number or percentage of bits encoded.

3. The system of claim 1, wherein the stage identification portion is to determine the stage in the progression using the number or percentage of bits encoded in the progressive identifier.

4. The system of claim 1, wherein the identifier encoding portion is to selects the number or percentage of bits to be encoded based on the stage in the progression determined by the stage identification portion.

5. The system of claim 1, wherein the progressive identifier is one of two-dimensional bar code or a quick read (QR) code.

6. The system of claim 1, wherein the identifier encoding portion is to encode the progressive identifier by changing selected bits of the progressive identifier to one of cyan, magenta, yellow, or a combination thereof.

7. The system of claim 1, wherein each stage of the progression corresponds to a position in a workflow.

8. The system of claim 1, wherein each stage of the progression corresponds to a position in a hierarchy.

9. A method, comprising:
receiving a progressive identifier at a stage of a progression, the progressive identifier included encoded data;
identifying a number or percentage of encoded bits in the progressive identifier; and
assigning access rights associated with the progressive identifier to at least one user, the access rights being based on the number or percentage of encoded bits.

10. The method of claim 9, further comprising:
extracting security data from the progressive identifier;
using the security data to obtain secure information,
wherein the security data is available at or after a predetermined stage of the progression.

11. The method of claim 10, wherein the using the security data to obtain secure information includes:
performing an operation on the security data and a single-use string to release the secure information.

12. The method of claim 11, wherein the operation includes an exclusive OR (XOR) or chained XOR operation.

13. The method of claim 9, further comprising:
modifying the progressive identifier to generate a modified progressive identifier, the modified progressive identifier having an increased number or percentage of encoded bits;
forwarding the modified progressive identifier to a next stage in the progression, wherein the increased number or percentage of bits uniquely corresponds to the next stage; and
repeating the assigning access rights at the next stage for at least one user.

14. The system of claim 1, further comprising a non-transitory computer-readable storage medium encoded with instructions executable by a processor of a computing system, the computer-readable storage medium comprising instructions to:
receive a progressive identifier at a stage of a progression, the progressive identifier including an encoded number or percentage of bits, the progressive identifier included encoded data; and
assign access rights associated with the progressive identifier to at least one user, the access rights being based on the encoded number or percentage of bits.

15. The system of claim 14, wherein the encoded number or percentage of bits uniquely corresponds to the stage of the progression.

16. The system of claim 1, wherein:
the identifier encoding portion comprises a three-dimensional printer;
an unencoded portion of the progressive identifier comprises a base material; and
an encoded portion of the progressive identifier comprises the base material treated with a pigment.

17. The system of claim 1, wherein the identifier encoding portion is to identify portions of the progressive identifier to be changed to encoded bits.

18. The system of claim 1, wherein the system is to assign access rights to a user based on the number or percentage of encoded bits of the progressive identifier.

19. The system of claim 1, wherein the system is to update access rights of a user based on a change to the number or percentage of encoded bits of the progressive identifier.

20. The method of claim 9, further comprising triggering a workflow based on the number or percentage of bits encoded in the processive identifier.

* * * * *